US012782603B2

(12) United States Patent
Nagarajan et al.

(10) Patent No.: US 12,782,603 B2
(45) Date of Patent: Nov. 3, 2026

(54) MITIGATING ATMOSPHERIC EFFECTS FROM GEOGRAPHICAL ANOMALIES ON REFERENCE PRESSURE ESTIMATES

(71) Applicant: NextNav, LLC, Sunnyvale, CA (US)

(72) Inventors: Badrinath Nagarajan, Cupertino, CA (US); Prashant Dave, Jodhpur (IN); Michael Dormody, San Jose, CA (US); Guiyuan Han, San Jose, CA (US); Wei Liu, San Jose, CA (US)

(73) Assignee: NextNav, LLC, Sunnyvale, CA (US)

( * ) Notice: Subject to any disclaimer, the term of this patent is extended or adjusted under 35 U.S.C. 154(b) by 773 days.

(21) Appl. No.: 18/053,907

(22) Filed: Nov. 9, 2022

(65) Prior Publication Data

US 2023/0152490 A1 May 18, 2023

Related U.S. Application Data

(60) Provisional application No. 63/264,203, filed on Nov. 17, 2021.

(51) Int. Cl.

*G01W 1/18* (2006.01)
*G01C 5/06* (2006.01)
*G06F 7/501* (2006.01)

(52) U.S. Cl.

CPC ................. *G01W 1/18* (2013.01); *G01C 5/06* (2013.01); *G06F 7/501* (2013.01)

(58) Field of Classification Search

CPC ........ G01C 5/06; G01C 25/00; G01C 21/206; G01C 21/3826; G01C 21/20;

(Continued)

(56) References Cited

U.S. PATENT DOCUMENTS 10,462,282 B1 * 10/2019 Blaha, Jr. ................ H04W 4/33
2010/0099433 A1 * 4/2010 Wigren ................ G01S 5/0236
455/456.1

(Continued)

FOREIGN PATENT DOCUMENTS

WO 2014202111 A1 12/2014

OTHER PUBLICATIONS

Ashraf, Muhammad, Jim C. Loftis, and K. G. Hubbard. "Application of geostatistics to evaluate partial weather station networks." Agricultural and forest meteorology 84.3-4 (1997): 255-271. (Year: 1997).*

(Continued)

*Primary Examiner* — Catherine T. Rastovski
*Assistant Examiner* — Carter W Ferrell
(74) *Attorney, Agent, or Firm* — MLO, a professional corp.

(57) ABSTRACT

A method involves determining an estimated position of a mobile device within a region. Atmospheric data measurement stations are identified within the region. A geographical anomaly is identified within the region that physically intervenes between the mobile device and a first atmospheric data measurement station. Based on a positional relationship between the mobile device, the geographical anomaly, and the first atmospheric data measurement station, it is determined that atmospheric pressure measurements collected at the first atmospheric data measurement station should be conditionally used for determining a reference pressure estimate. The reference pressure estimate is determined using a plurality of atmospheric pressure measurements collected at the atmospheric data measurement stations and conditionally using the atmospheric pressure measurements collected at the first atmospheric data measurement station. An estimated altitude of the mobile device is determined (Continued)

using a measurement of atmospheric pressure at the mobile device and the reference pressure estimate.

18 Claims, 10 Drawing Sheets

(58) Field of Classification Search
CPC ...... G01C 20/005; H04W 4/029; H04W 4/33; H04W 2250/12; G01L 27/002; G01L 27/005; G01L 7/00; G01W 1/10; G01W 1/02; G01W 1/00; G01W 1/18; G06F 7/501; H04M 2250/12
See application file for complete search history.

(56) References Cited

U.S. PATENT DOCUMENTS

| | | | | |
|---|---|---|---|---|
| 2012/0265373 | A1* | 10/2012 | Ingvalson ................ | G01C 5/06 701/4 |
| 2014/0200846 | A1* | 7/2014 | Wachter ................... | G01C 5/06 702/138 |
| 2016/0109259 | A1* | 4/2016 | Gunnarsson ............. | G01C 5/06 73/1.59 |
| 2016/0258749 | A1* | 9/2016 | MacGougan ........... | G01S 19/45 |
| 2017/0363423 | A1* | 12/2017 | Dormody .............. | G01L 27/002 |
| 2019/0004210 | A1* | 1/2019 | Altschule ................ | G01W 1/14 |
| 2020/0072606 | A1* | 3/2020 | Nagarajan ............ | G01C 21/206 |

OTHER PUBLICATIONS

Bekele et al., Comparative Evaluation of Spatial Prediction Methods in a Field Experiment for Mapping Soil Potassium, Soil Science, vol. 168, No. 1, Jan. 2003, pp. 15-28.

Kravchenko, Influence of Spatial Structure on Accuracy of Interpolation Methods, Soil Sci. Soc. Am. J., vol. 67, Sep.-Oct. 2003, pp. 1564-1571.

Lu and Wong, An adaptive inverse-distance weighting spatial interpolation technique, Computers & Geosciences 34, Sep. 2008, pp. 1044-1055.

Wu et al., Comparison of different spatial interpolation methods for historical hydrographic data of the lowermost Mississippi River, Annals of GIS, vol. 25, No. 2, pp. 133-151, Published online Mar. 25, 2019, https://doi.org/10.1080/19475683.2019.1588781.

International Search Report and Written Opinion dated Apr. 13, 2023 for PCT Patent Application No. PCT/IB2022/060800.

Invitation to Pay Additional Fees and, where applicable, protest fee, dated Feb. 20, 2023 for PCT International Application No. PCT/IB2022/060800.

* cited by examiner 600
602
603
604
605a
605b
605c
605d
605e
605f
605g
606a
606b
606c
606d 600
602
603
605a
605b
605c
605d
605e
605f
605g
608a
608b
610a 600
602
603
605a
605b
605c
605d
605e
605f
605g
608c
608d
610b

MITIGATING ATMOSPHERIC EFFECTS FROM GEOGRAPHICAL ANOMALIES ON REFERENCE PRESSURE ESTIMATES

RELATED APPLICATIONS

This application claims priority to U.S. Provisional Patent Application No. 63/264,203, filed Nov. 17, 2021, all of which is incorporated herein in its entirety.

BACKGROUND

A barometric altitude system for estimating an altitude of a mobile device often depends on having an accurate reference atmospheric pressure value for use in a barometric-based altitude equation. In some systems, the reference atmospheric pressure value is generated using a reference atmospheric pressure network that is made up of atmospheric sensors of varying stability and accuracy for measuring atmospheric pressure and/or temperature. Such sensors are often incorporated into atmospheric data measurement stations which include so-called stable pressure instruments (SPI) and/or weather stations. In general, a stable pressure instrument exhibits less sensor drift and produces more accurate atmospheric measurements as compared to a less stable pressure instrument of a so-called weather station.

A reference atmospheric pressure network is often designed such that weather stations are located in regions in which an ambient atmospheric pressure is an accurate representation of atmospheric pressure over a broad geographical region. However, geographical regions are often characterized by anomalous features such as ridges, valleys, waterbodies, and coastlines. These geographical anomalies create localized atmospheric effects such as localized deviations in atmospheric pressure, temperature, and/or humidity. Thus, a weather station or stable pressure instrument situated in the vicinity of geographical anomalies may produce atmospheric pressure measurements that are less representative of the broader geographical region. As a result, atmospheric pressure data from these instruments may lead to an inaccurate reference pressure for the broader geographical region.

SUMMARY

In some embodiments, a method involves determining, by one or more processors, an estimated position of a mobile device within a region. Multiple atmospheric data measurement stations are identified within the region by the one or more processors. A geographical anomaly within the region is identified, by the one or more processors, that physically intervenes between the estimated position of the mobile device and a position of a first atmospheric data measurement station of the atmospheric data measurement stations. Based on a positional relationship between the estimated position of the mobile device, the geographical anomaly, and the position of the first atmospheric data measurement station, it is determined, by the one or more processors, that atmospheric pressure measurements collected at the first atmospheric data measurement station should be conditionally used for determining a reference pressure estimate. The reference pressure estimate is determined, by the one or more processors, using a plurality of atmospheric pressure measurements collected at the multiple atmospheric data measurement stations and conditionally using the atmospheric pressure measurements collected at the first atmospheric data measurement station. An estimated altitude of the mobile device is determined, by the one or more processors, using a measurement of atmospheric pressure at the mobile device and the reference pressure estimate.

In some embodiments, a method involves determining, by one or more processors, a first position of a weather station within a region. Multiple respective second positions of multiple stable pressure instruments within the region are determined using the one or more processors. A geographical anomaly is identified within the region, by the one or more processors using a terrain database, that physically intervenes between the first position and one or more of the second positions. Atmospheric pressure measurements are collected, using the one or more processors, at the stable pressure instruments at the one or more of the second positions. Based on a positional relationship between the first position of the weather station, the geographical anomaly, and the one or more of the second positions, it is determined, using the one or more processors, that the atmospheric pressure measurements should be conditionally used for calibrating the weather station. A reference pressure estimate is conditionally determined, by the one or more processors, using the atmospheric pressure measurements collected by the stable pressure instruments at the one or more of the second positions. An atmospheric pressure sensor of the weather station is calibrated, by the one or more processors, using the reference pressure estimate.

DETAILED DESCRIPTION

Figure 1:
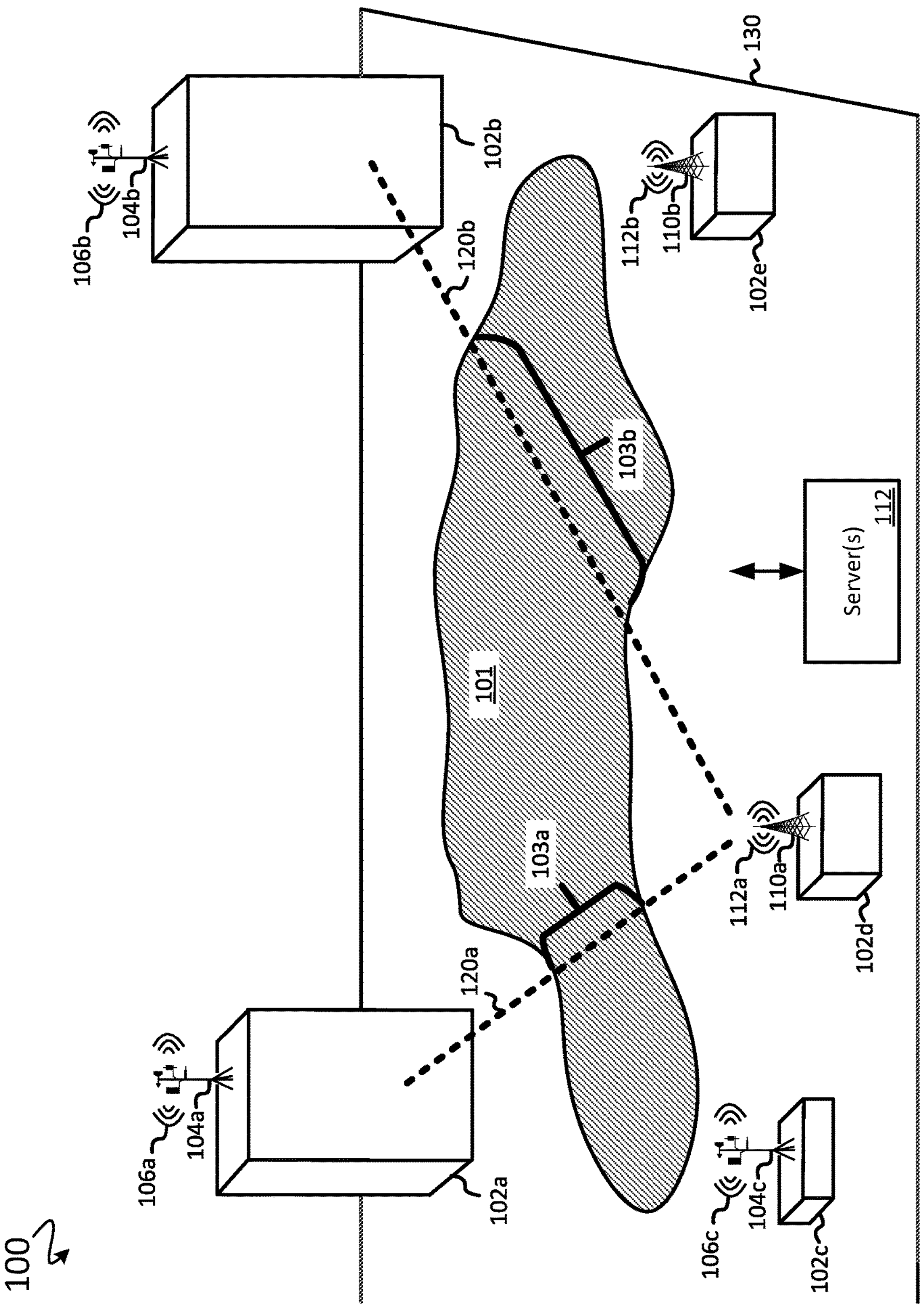
FIG. 1 shows an example of a first region with a first geographical anomaly and a portion of a reference pressure network for calibrating a weather station, in accordance with some embodiments.

Geographical regions are often characterized by anomalous features such as ridges, mesas, valleys, water bodies, and coastlines. Atmospheric sensors situated in the vicinity of such features may produce atmospheric pressure measurements that are less representative of a broader geographical region. Systems and methods disclosed herein advantageously provide for an increased calibration accuracy of atmospheric sensors in geographical regions impacted by geographical anomalies. Such systems and methods may guide the design of a reference pressure network, as well as improve upon the accuracy of an altitude estimation of mobile devices in the vicinity of such anomalies. Additionally, the systems and methods disclosed herein are advantageously operable to guide the design of reference pressure networks across many regions which may have varying complexity and which would not be feasible to be designed manually by a person. For example, some regions may have so many changes in elevation and/or bodies of water that consideration of each geographic anomaly by a human is not feasible. Therefore, the systems and methods disclosed herein provide a substantial advantage as compared to prior art solutions which may require that a human manually identify geographical anomalies within a region and then manually design the reference network accordingly.

As is known in the art, altitude estimation of a mobile device may use a barometric equation that uses both an atmospheric pressure measurement made at the mobile device as well as a reference atmospheric pressure measurement associated with a geographical region that encompasses the mobile device. The reference atmospheric pressure measurement may be generated using a reference pressure network. In general, a reference pressure network may include weather stations and stable pressure instruments, among other components. Weather stations and stable pressure instruments are referred to generally as atmospheric data measurement stations herein. Weather stations and stable pressure instruments are each operable to provide (e.g., to a server and/or a mobile device) measurements of atmospheric conditions such as atmospheric pressure, temperature, wind speed, humidity, and other atmospheric conditions. A weather station is often less accurate and more prone to sensor drift as compared to a so-called stable pressure instrument. Because weather stations are often less expensive in both manufacturing costs and installation costs as compared to stable pressure instruments, weather stations may be more ubiquitous within the reference pressure network. Fortunately, the less stable weather stations may be calibrated using the stable pressure instruments to achieve an acceptable level of accuracy and stability.

As disclosed herein, consideration of geographical anomalies may advantageously guide the design of a reference atmospheric pressure network when determining where weather stations and/or stable pressure instruments are to be located within a geographical region. Some criteria used to optimize a topology of a reference atmospheric pressure network when adding or using stable pressure instruments or weather stations within the reference atmospheric pressure network are discussed with reference to FIG. 1 and FIG. 2.

FIG. 1 includes an example of a first geographical region 100 that includes a portion of a reference atmospheric pressure network and geographical anomalies, in accordance with some embodiments. As shown, the first geographical region 100 includes a large lake 101 (i.e., a geographical anomaly), a coastline 130 (i.e., another geographical anomaly), and buildings/structures 102*a-e*. The reference atmospheric pressure network includes weather stations 104*a-c*, stable pressure instruments 110*a-b*, and one or more servers 112. Also shown are first signals 106*a-c* associated with the respective weather stations 104*a-c*, second signals 112*a-b* associated with the respective stable pressure instruments 110*a-b*, two-dimensional lines 120*a-b*, and two-dimensional (e.g., horizontal) distance measurements 103*a-b*.

The server 112 is operable to send and receive information via the signals 106*a-c* and 112*a-b* using a wired and/or wireless network. One or more of the weather stations 104*a-c* may include an atmospheric sensor that is less accurate and/or less stable (e.g., more prone to drift) than a corresponding atmospheric sensor of the stable pressure instruments 110*a-b*. Thus, in some embodiments, the server 112 is configured to use information received from the stable pressure instruments 110*a-b* to calibrate the weather stations 104*a-c*. An approach to calibrate a less stable atmospheric sensor using a stable pressure instrument is described in U.S. Pat. No. 10,514,258 B2, which issued on Dec. 24, 2019, all of which is incorporated herein by reference for all purposes.

A first criterion used to optimize a topology of a reference atmospheric pressure network when adding stable pressure instruments or weather stations includes ensuring that a distance over a waterbody that intervenes between a stable pressure instrument and a weather station that will be calibrated using the stable pressure instrument is less than a threshold distance (e.g., 1 km, 2 km, 5 km, etc.). In the example shown in FIG. 1, a distance measurement 103*a* of the line 120*a* that passes over the large lake 101 from the stable pressure instrument 110*a* to the weather station 104*a* is given to be less than a threshold distance (e.g., 1 km). As such, the weather station 104*a* could be calibrated using the stable pressure instrument 110*a*. In contrast, a distance measurement 103*b* of the line 120*b* that passes over the large lake 101 from the stable pressure instrument 110*a* to the weather station 104*b* is given to be greater than the threshold distance. As such, the weather station 104*b* would not be calibrated using the stable pressure instrument 110*a*. Instead, the stable pressure instrument 110*b* could be added to the reference atmospheric pressure network of the region 100 to accurately calibrate the weather station 104*b* (i.e., because a geographic anomaly does not intervene between the stable pressure instrument 110*b* and the weather station 104*b*). In this simplified example, only the large lake 101 is shown as a water body. However, in some regions there may be tens to hundreds of such water bodies and therefore the first example criterion used to optimize a topology of a reference atmospheric pressure network could not be feasibly determined by a human.

Additional criteria used to optimize a topology of a reference atmospheric pressure network when adding stable pressure instruments or weather stations to the reference atmospheric pressure network are discussed with reference to FIG. 2.

Figure 2:
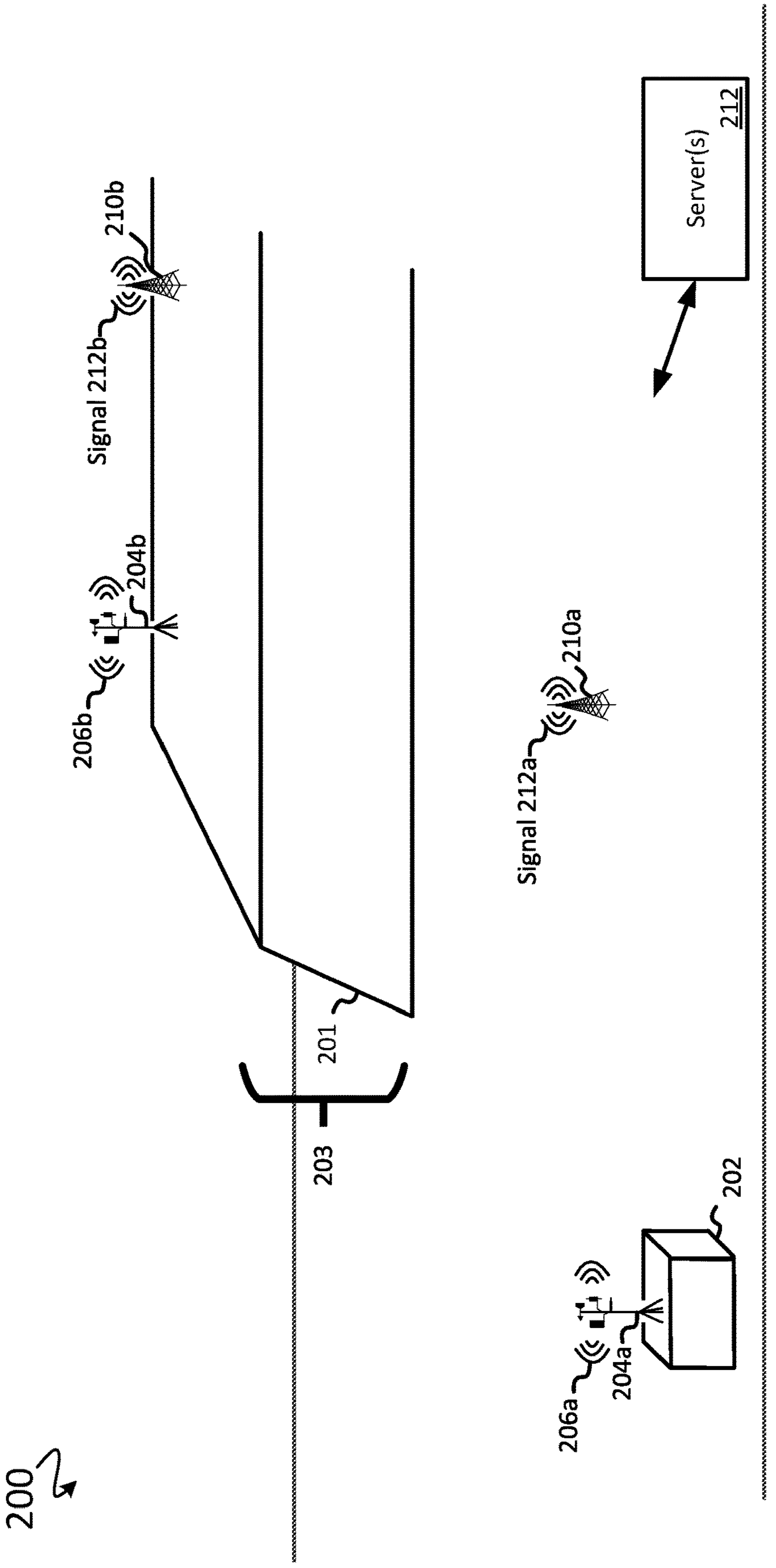
FIG. 2 shows an example of a second region with a second geographical anomaly and a portion of a reference pressure network for calibrating a weather station, in accordance with some embodiments.

FIG. 2 includes an example of a second geographical region 200 that includes a portion of a reference atmospheric pressure network and a geographical anomaly, in addition to other features, in accordance with some embodiments. As shown, the second geographical region 200 includes a large mesa 201 (i.e., a geographical anomaly), and building/structure 202. A reference atmospheric pressure network of the region 200 includes weather stations 204*a-b*, stable pressure instruments 210*a-b*, and one or more servers 212. Also shown are first signals 206*a-b* associated with the respective weather stations 204*a-b*, second signals 212*a-b* associated with the stable pressure instruments 210*a-b*, and a height measurement 203. The server 212 is the same as, or is similar to, to the server 112 shown in FIG. 1.

With reference to FIG. 2, a second criterion used to optimize a topology of a reference atmospheric pressure network when adding stable pressure instruments or weather stations to the reference atmospheric pressure network includes ensuring that a height difference between a stable pressure instrument and a weather station that will be calibrated using the stable pressure instrument does not exceed a threshold difference in height (e.g., 100 m, 150 m, 200 m, etc.). In the example shown in FIG. 2, an altitude difference, due to the mesa 201, intervenes between the stable pressure instrument 210*a* and the weather station 204*b*. The height measurement 203 of the mesa is given to be greater than the threshold height. Thus, the weather station 204*b* on top of the mesa 201 would not be calibrated using the stable pressure instrument 210*a* that is at the base of the mesa 201. Instead, the stable pressure instrument 210*b* could be added to the reference atmospheric pressure network for the second geographical region 200 on top of the mesa 201 to calibrate the weather station 204*b* (i.e., because a geographic anomaly does not intervene between the stable pressure instrument 210*b* and the weather station 204*b*). Once again, in this simplified example, only the mesa 201 is shown as a geographical anomaly based on a height difference. However, in some regions there may be tens to hundreds of such height differences and therefore the second example criterion used to optimize a topology of a reference atmospheric pressure network could not be feasibly determined by a human (especially when also considering the first example criterion in conjunction with the second example criterion).

Despite adhering to such criteria for specifying a topology of the reference pressure network, in practice, it is likely that the pressure measurements will continue to be impacted by geographical anomalies such as waterbodies and changes in terrain. For example, referring back to FIG. 1, weather stations located near a coastline (e.g., the coastline 130) that has a dominant wind direction pointing from the waterbody to inland will experience a different pressure environment as compared to weather stations further inland (e.g., tens of km from the coastline). Thus, in some embodiments, weather stations located near a coastline are advantageously calibrated using a stable pressure instrument that is also situated near that coastline. Similarly, inland weather stations are calibrated using a stable pressure instrument that is also located inland. In the example shown in FIG. 1, the weather station 104*b* is located close to the coastline 130 and would therefore be calibrated using the stable pressure instrument 110*b* which is also located close to the coastline 130. By contrast, the weather station 104*b* would not be calibrated using the stable pressure instrument 110*a* because the stable pressure instrument 110*a* is located far from the coastline 130. Likewise, the weather station 104*c*, which is located far from the coastline 130, would be calibrated using the stable pressure instrument 110*a* which is also located far from the coastline 130. By contrast, the weather station 104*c* would not be calibrated using the stable pressure instrument 110*b* which is located close to the coastline 130.

Similar to how the first criterion was used to optimize a topology of a reference atmospheric pressure network, in some embodiments a distance over a waterbody between a stable pressure instrument and a weather station is considered when calibrating the weather station. In the example shown in FIG. 1, the distance measurement 103*a* of the line 120*a* that passes over the large lake 101 is given to be less than a threshold distance (e.g., 1 km, 2 km, 5 km, etc.) so the weather station 104*a* would be calibrated by the stable pressure instrument 110*a*. In contrast, beyond considerations of the coastline 130, the distance measurement 103*b* of the line 120*b* that passes from the stable pressure instrument 110*a* to the weather station 104*b* over the large lake 101 is given to be greater than the threshold distance. Therefore, the weather station 104*b* would not be calibrated by the stable pressure instrument 110*a*. As mentioned above, though this is a simplified example, some regions include many geographical anomalies, making such considerations infeasible to be performed by a human.

Referring now to FIG. 2, similar to how the second criterion was used to optimize a topology of a reference atmospheric pressure network, a height difference between a stable pressure instrument and a weather station is considered when calibrating the weather station. In the example shown in FIG. 2, the height measurement 203 of the mesa 201 is given to be greater than a threshold height (e.g., 100 m, 150 m, 200 m, etc.). Thus, the weather station 204*b* on top of the mesa 201 would not be calibrated using the stable pressure instrument 210*a* that is at the base of the mesa 201. Again, though this is a simplified example, many regions include many such geographical anomalies, making such considerations infeasible to be performed by a human.

In addition to considering local environmental effects when calibrating less stable atmospheric sensors such as those of the weather stations discussed above, atmospheric effects due to geographical anomalies may impact the accuracy of an altitude estimate determined using a barometric-based altitude equation for a mobile device. As described above, mobile devices may use a reference pressure generated by weather stations and stable pressure instruments as an input to a barometric-based altitude equation to generate an estimated altitude of the mobile device. The computation of a representative reference atmospheric pressure for use by a barometric altitude system is described in U.S. Pat. No. 10,386,448 B2, which issued on Aug. 20, 2019, all of which is incorporated herein by reference for all purposes.

Figure 3:
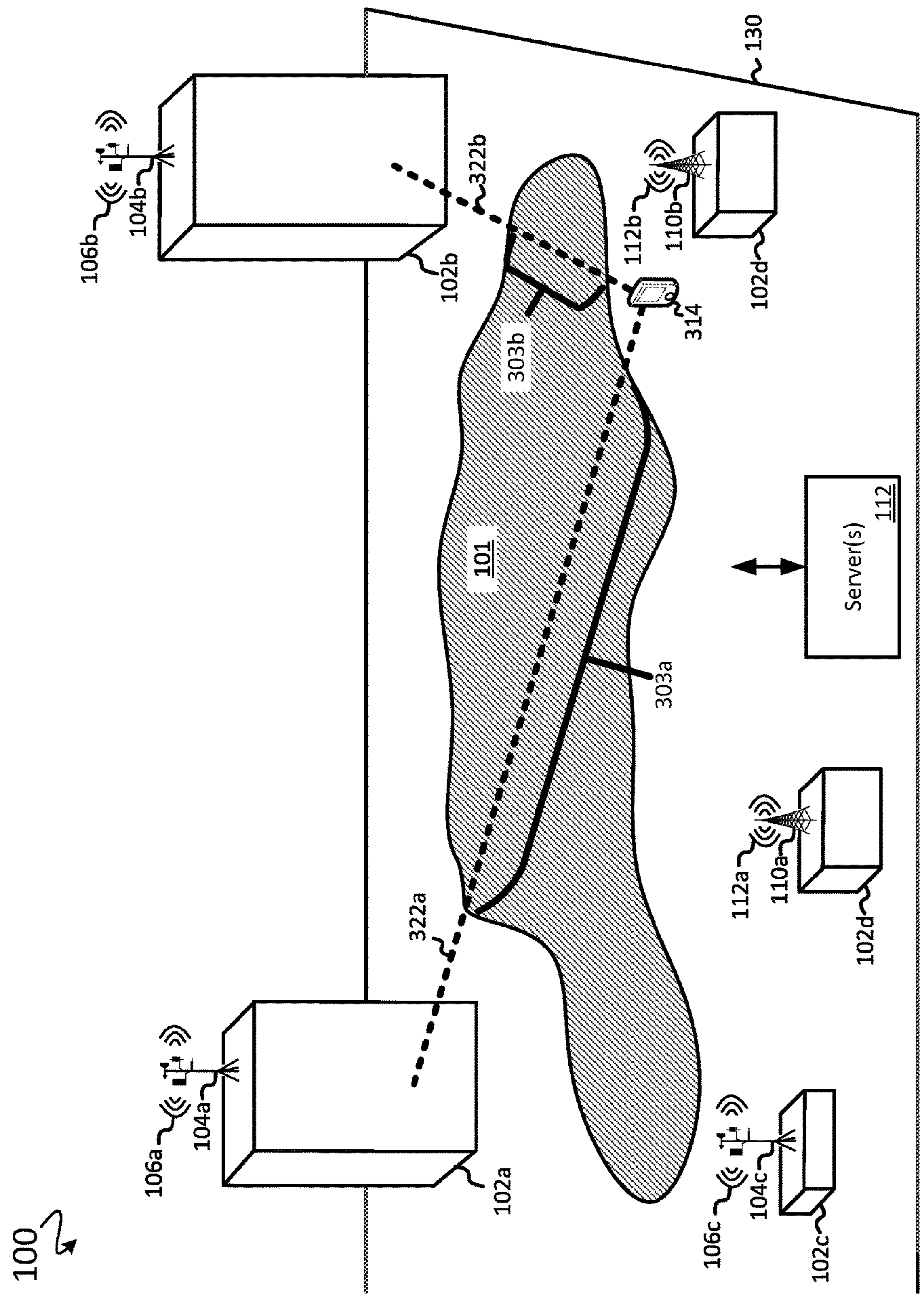
FIG. 3 shows an example of the first region and a portion of a reference pressure network for determining an estimated altitude of a mobile device, in accordance with some embodiments.

In some embodiments, a reference pressure used by the mobile device for generating an estimated altitude is generated using all atmospheric data measurement stations, such as weather stations/stable pressure instruments, that are within a defined radius (e.g., 10 km) of the mobile device, but excluding any weather station/stable pressure instrument for which a two-dimensional distance over water along a line joining an estimated position of the mobile device and a position of the weather station/stable pressure instruments exceeds a threshold distance (e.g., 1 km, 2 km, 5 km, etc.). FIG. 3 includes the elements of the first geographical region 100 described with reference to FIG. 1, with the addition of a mobile device 314, in accordance with some embodiments. Also shown are lines 322*a-b* and distance measurements 303*a-b*. The mobile device 314 may be a smartphone, a tablet computer, a laptop computer, a desktop computer, a surveying device, or other user equipment. In the example shown in FIG. 3, the distance measurement 303*a* of the line 322*a* that passes over the large lake 101 is given to be greater than a threshold distance (e.g., 1 km), so atmospheric pressure measurements from the weather station 104*a* would be "conditionally used" (see below) to generate a reference pressure for estimating an altitude of the mobile device 314. In contrast, a distance measurement 303*b* of the line 322*b* that passes over the large lake 101 is given to be less than the threshold distance, so atmospheric pressure measurements from the weather station 104*b* could be "unconditionally used" (see below) to generate a reference pressure for the mobile device 314.

In some embodiments, conditional use of an atmospheric pressure measurement involves wholly excluding that atmospheric pressure measurement for the determination of the reference pressure. In other embodiments, conditional use of the atmospheric pressure measurement involves attenuating the atmospheric pressure measurement (e.g., via weighting) such that the atmospheric pressure measurement does not contribute to the determined reference pressure as much as an unattenuated atmospheric pressure measurement. In some embodiments, unconditional use of an atmospheric pressure measurement involves wholly including that atmospheric pressure measurement for determination of the reference pressure. In other embodiments, unconditional use of the atmospheric pressure measurement involves weighting the atmospheric pressure measurement such that the atmospheric pressure measurement contributes to the determined reference pressure proportionally to some preferred criteria.

Figure 4:
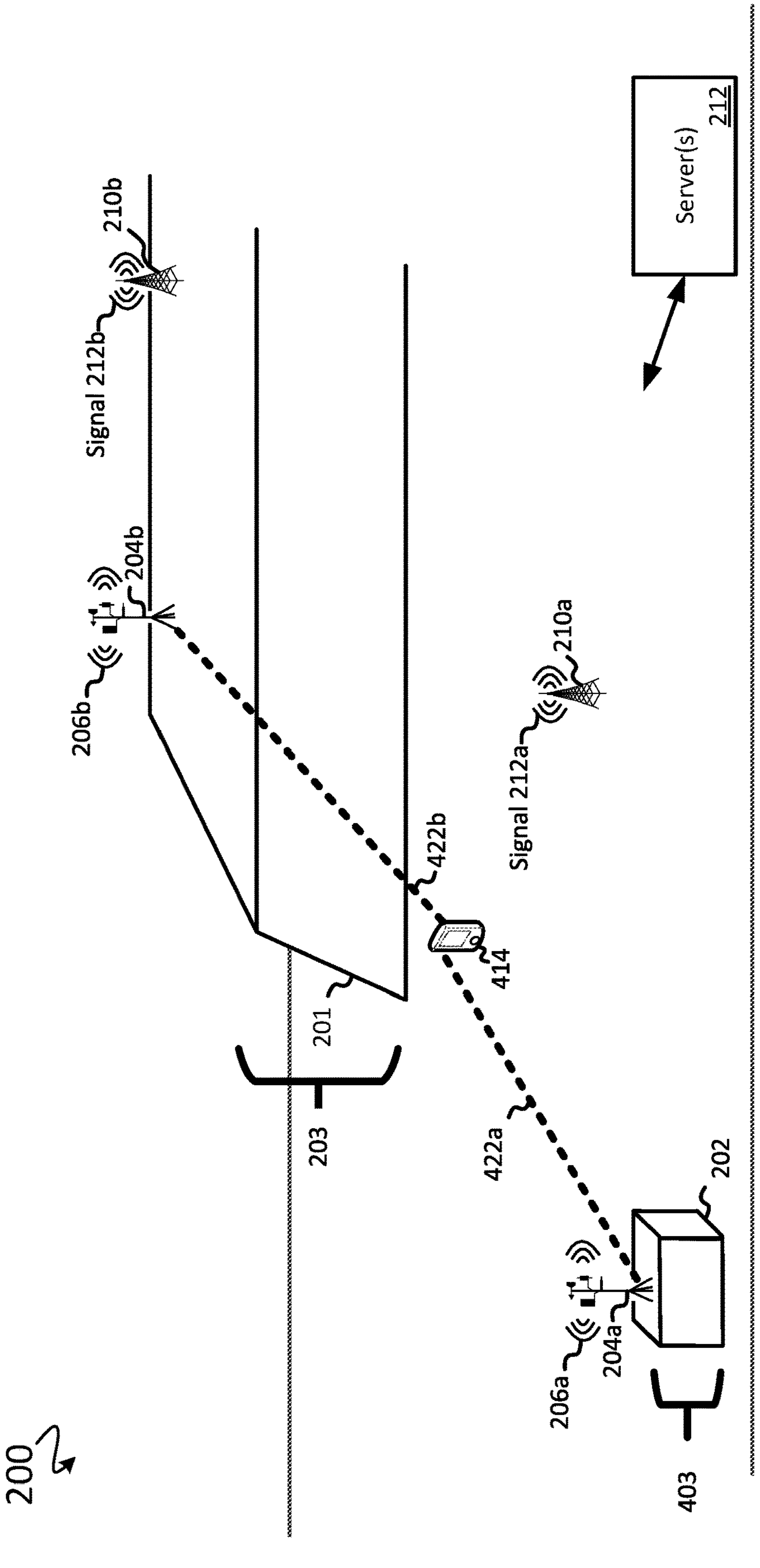
FIG. 4 shows an example of the second region and a portion of a reference pressure network for estimated altitude of a mobile device, in accordance with some embodiments.

As shown in FIG. 4, in some embodiments, a reference pressure used by the mobile device for generating an estimated altitude is generated using all of the weather stations/stable pressure instruments within a defined radius (e.g., 10 km) of the mobile device but excluding any weather station/stable pressure instrument for which a change in height measurements along a line joining the mobile device and the weather station/stable pressure instrument exceeds a height threshold. FIG. 4 includes the elements of the second geographical region 200 described with reference to FIG. 2, with the addition of a mobile device 414, in accordance with some embodiments. Also shown are lines 422*a-b* and a height measurement 403. The mobile device 414 may be a smartphone, a tablet computer, a laptop computer, a desktop computer, a surveying device, or other user equipment. In the example shown in FIG. 4, the height measurement 203 along the line 422*b* from the mobile device 414 to the weather station 204*b* is given to be greater than a height threshold (e.g., 150 m). As such, atmospheric pressure measurements from the weather station 204*b* would be conditionally used when determining a reference pressure used by the mobile device 414.

In contrast, the height measurement 403 along the line 422*a* from the mobile device 414 to the weather station 204*a* is given to be not greater than a height threshold. As such, atmospheric pressure measurements from the weather station 204*a* could be unconditionally used when determining a reference pressure used by the mobile device 414.

Figure 5B:
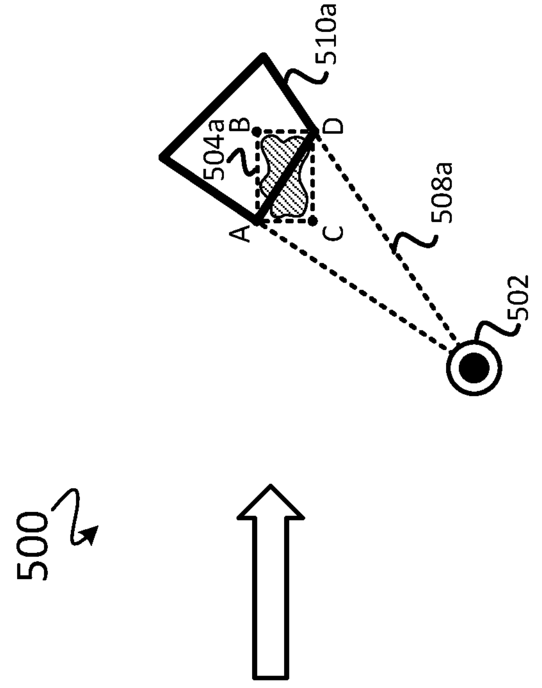
FIGS. 5A-D show first examples of exclusion zones that are determined to mitigate the effects of a geographical anomaly when determining a reference pressure, in accordance with some embodiments.
Figure 5A:
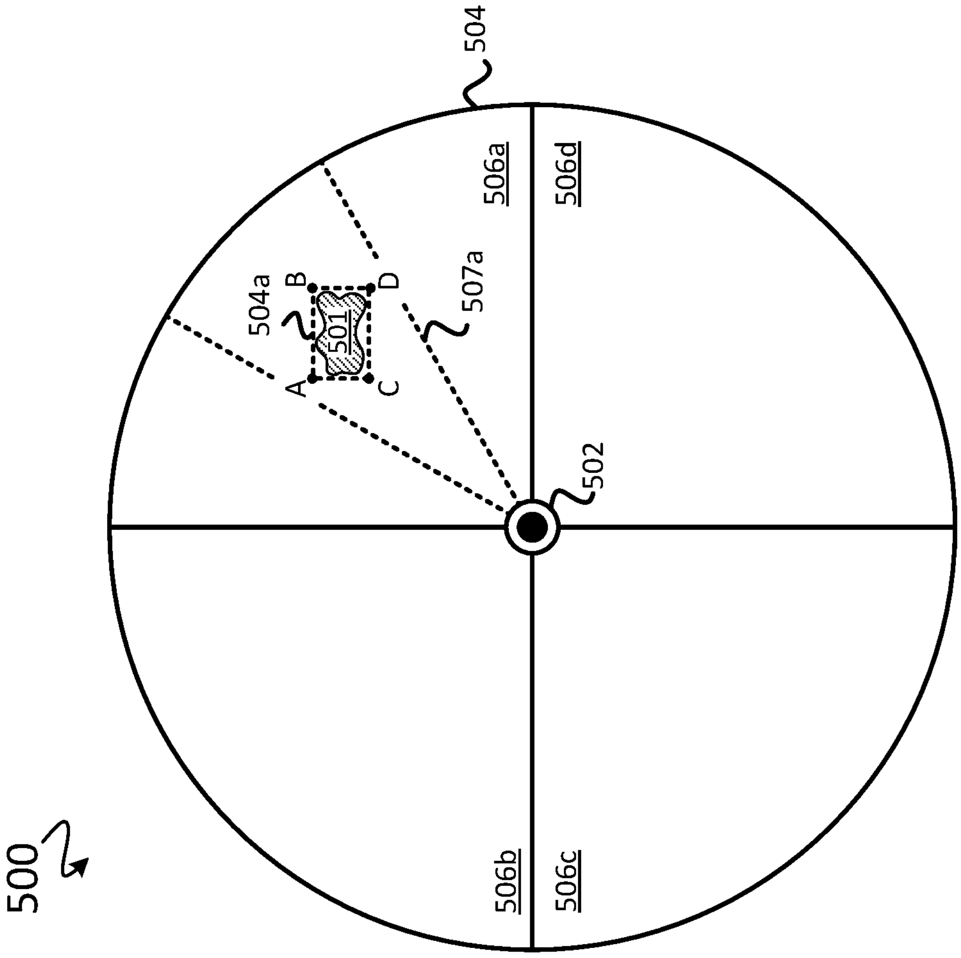

In other embodiments, a reference pressure used by the mobile device for generating an estimated altitude is generated by conditionally using weather stations that are associated with exclusion zones as described below and with reference to FIGS. 5A-D, FIGS. 6A-C, and FIG. 7. That is, if the mobile device is located in an exclusion zone associated with a particular weather station, atmospheric pressure measurements from that weather station are conditionally used when determining a combined reference pressure computation. FIG. 5A shows an orthoscopic view of a first portion of a geographical region 500 having a geographical anomaly 501 (e.g., a large lake). A reference pressure network of the geographical region 500 includes a weather station 502. To determine a first exclusion zone associated with the weather station 502, a region 504 that surrounds the weather station 502 is determined. In some embodiments, the region 504 is described by an outer perimeter (e.g., a circle, oval, or other shape) having a radius of about 10 km and quadrants 506*a-d*. A bounding box (or other polygon) 504*a* having corners A, B, C, and D and that includes the geographical anomaly 501 is determined within a first section 507*a* of a first quadrant 506*a* of the region 504. As shown in FIG. 5B, a sub-section 508*a* is determined for the bounding box 504*a* such that lines (i.e., "bounding edges") of the sub-section 508*a* connect between the weather station 502 and opposite corners (e.g., 'A' and 'D') of the bounding box 504*a*. An exclusion zone 510*a* is then determined by extending bounding edges of the sub-section 508*a* to an outer perimeter of the region 504. If a mobile device is within the exclusion zone 510*a* such that the geographic anomaly intervenes between the mobile device and the weather station 502, a reference pressure generated for altitude estimation of the mobile device will be generated conditionally using atmospheric pressure measurements from the weather station 502. If the mobile device is not within the exclusion zone 510, a reference pressure generated for altitude estimation of the mobile device could be generated unconditionally using atmospheric pressure measurements from the weather station 502. Similar exclusion zones are determined for each section (e.g., an angular range) of each of the quadrants 506*a-d* of the region 504 depending on the presence of geographical anomalies in that section. Because some regions may have tens to hundreds of such geographical anomalies, determining exclusion zones which account for all of the geographical anomalies is not feasible for a human.

Figure 5D:
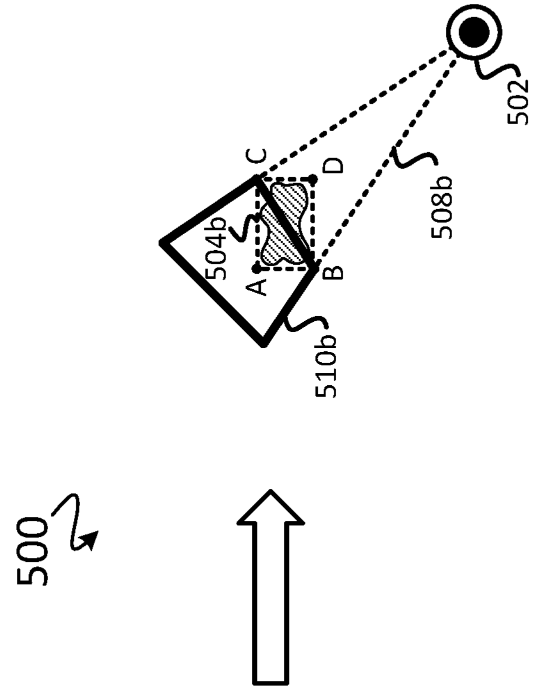
Figure 5C:
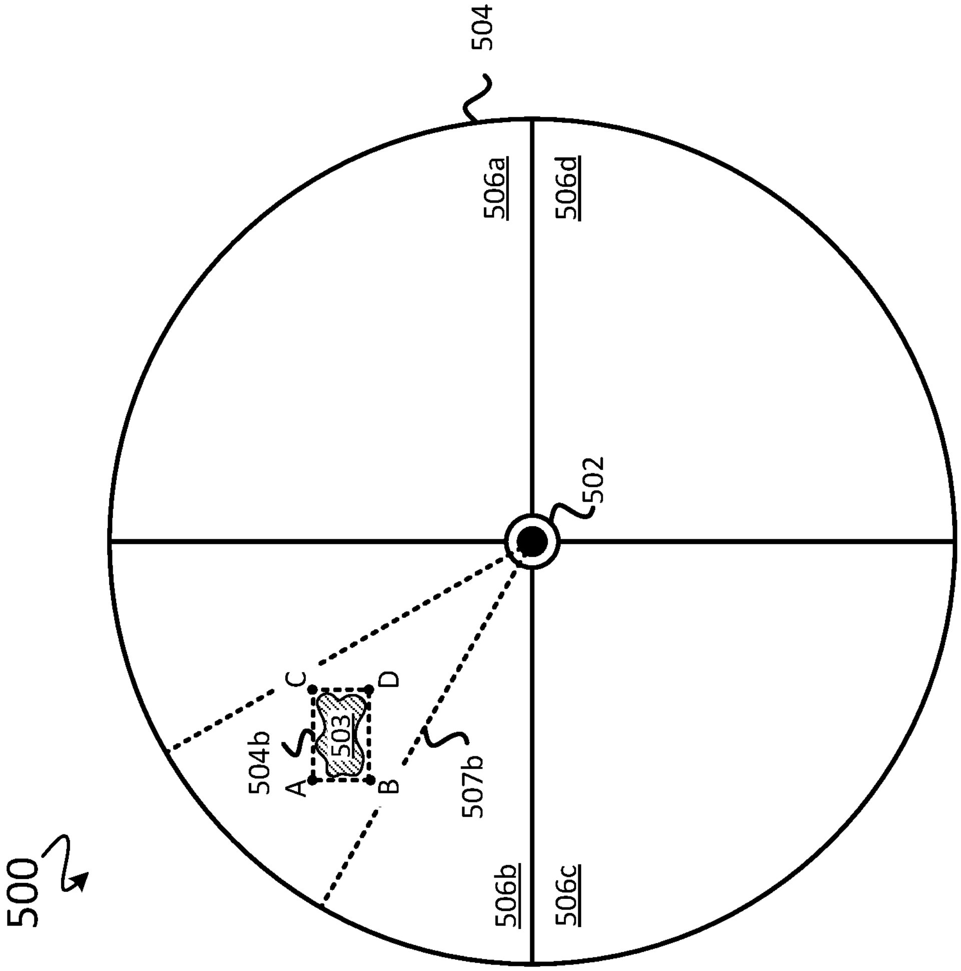

FIG. 5C shows a second portion of the geographical region 500 having a geographical anomaly 503 (e.g., another large lake) and the weather station 502. To determine a second exclusion zone associated with the weather station 502, a bounding box 504*b* having corners A, B, C, and D and that includes the geographical anomaly 503 is determined within a second section 507*b* of a second quadrant 506*b* the region 504. As shown in FIG. 5D, a sub-section 508*b* is determined for the bounding box 504*b* such that lines of the sub-section 508*b* connect between the weather station 502 and opposite corners ('B' and 'C') of the bounding box 504*b*. An exclusion zone 510*b* is then determined by extending lines of the sub-section 508*b* to an outer perimeter of the region 504. If a mobile device is within the exclusion region 510*b*, a reference pressure generated for altitude estimation of the mobile device would conditionally use atmospheric pressure measurements from the weather station 502. In some embodiments, the sections 507*a-b* are defined by an angular range of the region 504. In some embodiments, the angular range is about 30 degrees.

Figures 6A, 6B, 6C:
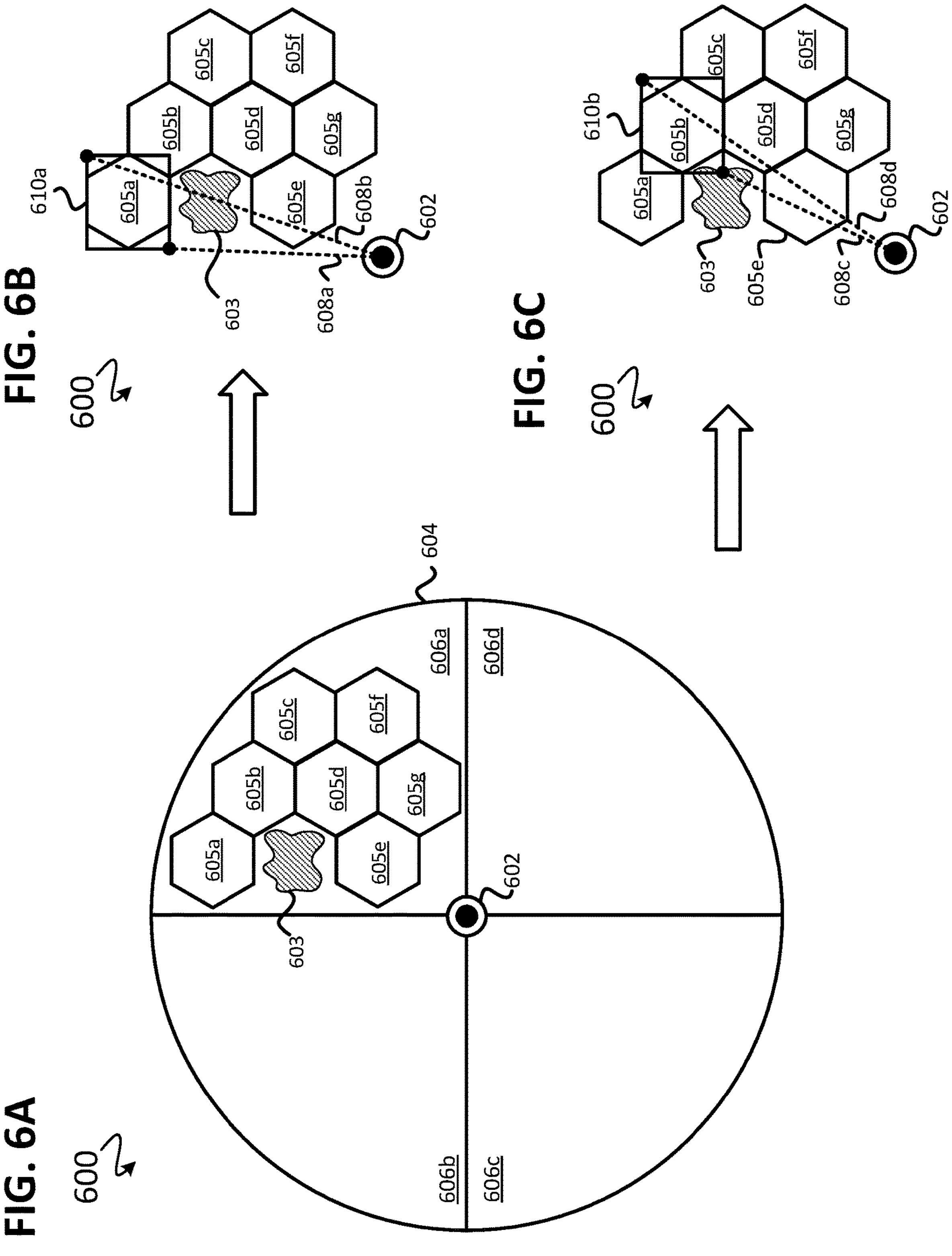
FIGS. 6A-C show second examples of exclusion zones that are determined to mitigate atmospheric effects of a geographical anomaly when determining a reference pressure, in accordance with some embodiments.

Another embodiment for determining an exclusion zone is shown and described with reference to FIGS. 6A-C. FIG. 6A shows a first portion of a geographical region 600 having a geographical anomaly 603 (e.g., a large lake). A reference pressure network of the geographical region 600 includes a weather station 602. To determine an exclusion zone associated with the weather station 602, a region 604 that surrounds the weather station 602 is determined. In some embodiments, the region 604 is described by a circle having a radius of about 10 km and quadrants 606*a-d*. Terrain polygons within the region 604 are then determined. An example portion of terrain polygons 605*a-g* within the region 604 are shown in FIG. 6A. A bounding box is determined for each of the terrain polygons within the region 604. A first example bounding box 610*a* determined for the terrain polygon 605*a* is shown in FIG. 6B and a second example bounding box 610*b* determined for the terrain polygon 605*b* is shown in FIG. 6C. Lines between the weather station and opposite corners of each of the bounding boxes are then determined. Example lines 608*a-b* between the weather station 602 and the bounding box 610*a* are shown in FIG. 6B and example lines 608*c-d* between the weather station 602 and the bounding box 610*b* are shown in FIG. 6C. If a distance "over" (i.e., intersecting in two-dimensions) the large lake 603 (i.e., over water) from the weather station 602 along either of the lines 608*a-b* to the corners of the bounding box 610*a* exceeds a distance threshold (e.g., 1 km), then the terrain polygon 605*a* is added to an exclusion zone. Similarly, if a distance over the large lake 603 (i.e., over water) from the weather station 602 along either of the lines 608*c-d* to the corners of the bounding box 610*b* exceeds the distance threshold, then the terrain polygon 605*b* is added to an exclusion zone. This process is repeated for each terrain tile of the region 604. In the example shown in FIG. 6B, a portion of the line 608*b* that passes over the large lake 603 is given to exceed a threshold distance, and as such, the terrain tile 605*a* is added to an exclusion zone. By contrast, in the example shown in FIG. 6C, neither of the lines 608*c-d* are given to have a portion over the large lake 603 that is given to exceed the threshold distance. As such, the terrain polygon 605*b* is not added to the exclusion zone. Because some regions may have tens to hundreds of such geographical anomalies, determining exclusion zones which account for all of the geographical anomalies is not feasible for a human.

Figure 7:
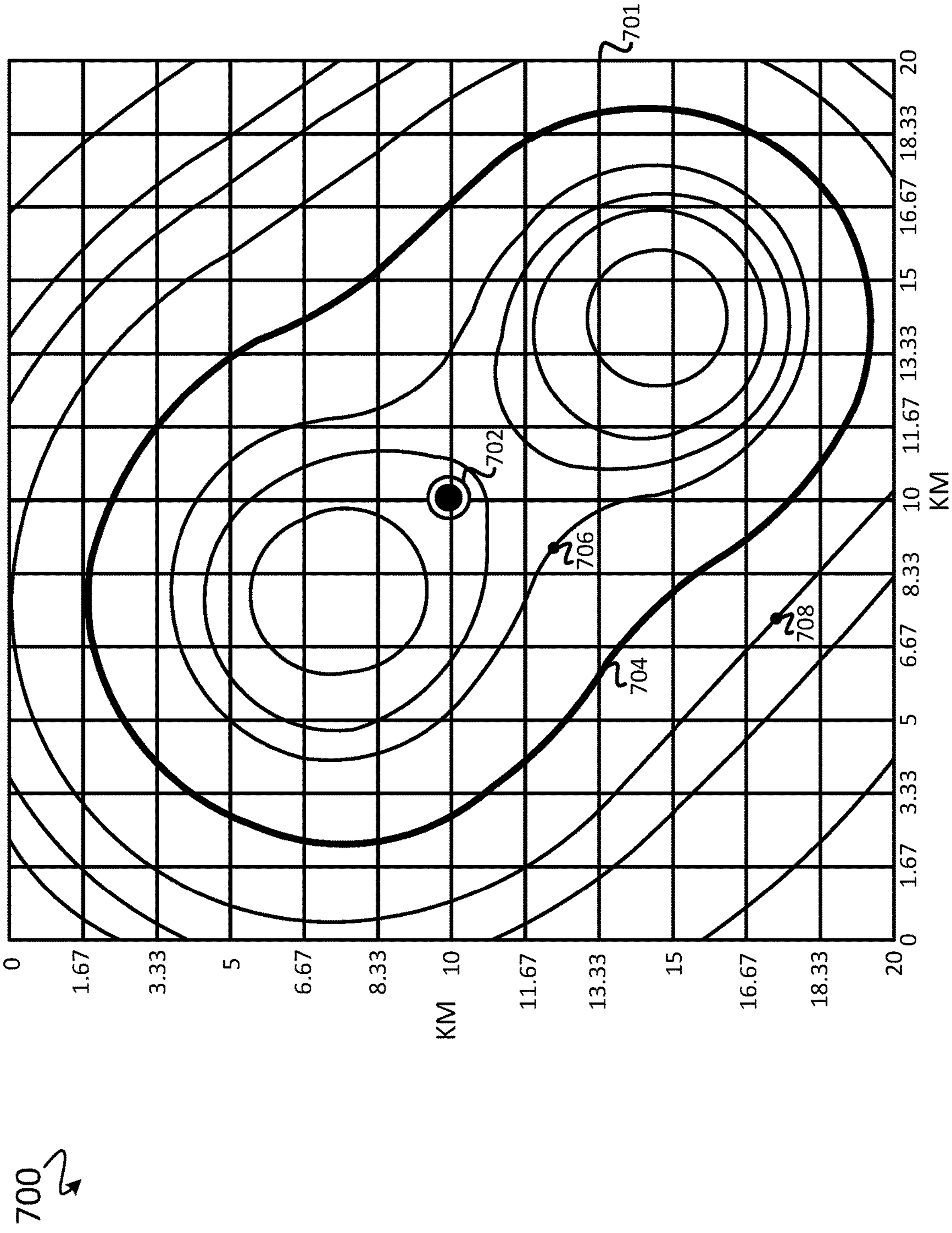
FIG. 7 shows a third example of an exclusion zone that is determined to mitigate atmospheric effects of a geographical anomaly when determining a reference pressure, in accordance with some embodiments.

Yet another embodiment for determining an exclusion zone is shown and described with reference to FIG. 7. FIG. 7 shows a portion of a geographical region 700. A reference pressure network of the geographical region 700 includes a weather station 702. To determine an exclusion zone in the example shown, a bounding region 701 (e.g., a 20 km by 20 km square) that surrounds the weather station 702 is determined. Isolines (e.g., 704, 706, and 708, among others) of constant elevations are then determined within the bounding region 701. For a given location within the bounding region 701, if an isoline that exceeds a threshold elevation (e.g., 150 m) intervenes between a location of a mobile device within the bounding region 701 and the weather station 702, the pressure measurements from the weather station 702 would be conditionally used when determining a reference pressure for that mobile device. In the example shown, the isoline 704 is given to represent the threshold elevation and therefore constitutes an exclusion zone. That is, a mobile device outside of the perimeter of the isoline 704 would conditionally use a reference pressure determined using pressure measurements from the weather station 702. In some embodiments, a mobile device inside the perimeter of the isoline 704 would unconditionally use a reference pressure determined using pressure measurements from the weather station 702.

In other embodiments, as described below, rather than defining discrete exclusion zones, a continuous interpolated reference pressure surface using spatially correlated pressure data within a geographical region is determined. For example, a reference pressure for an unknown location (i.e., a location at which pressure is not measured) may be computed from a set of weather stations using multi-beacon average methods as described in U.S. Pat. No. 10,386,448 B2, which issued on Aug. 20, 2019, all of which is incorporated herein by reference for all purposes.

When computing a reference pressure for an unknown location, there are primarily three techniques to capture spatial correlation while interpolating the spatial data, i.e., spline interpolation, inverse distance weighted (IDW), and Kriging interpolation. Spline interpolation is a deterministic method that can be imagined as fitting a mathematical function to a given set of known points. Although simple in implementation, it is sensitive to outliers and does not provide an error estimate. Similar to spline interpolation, the IDW technique is also a deterministic technique. The IDW technique uses distance information between sampled points as weights while computing an average value (i.e., an interpolated value) for an unsampled location. In the IDW techniques, the weights are inversely proportional to the distance between sampled points and the unsampled location. As such, nearby points are assigned larger weights as compared to farther points. The IDW technique is simple to implement and understand but the technique is sensitive to outliers in the data and does not provide an error estimate.

For a set of weather stations that are equally spaced and around a user, the multi-beacon average described in U.S. Pat. No. 10,386,448 B2, incorporated above, is equivalent to a bi-linear spatial interpolation. However, such a bi-linear spatial interpolation is devoid of any parameters that explicitly represent the spatial correlation among the weather stations.

In some embodiments, an extension of the previous reference pressure computation using a bi-linear like spatial interpolation is through the use of a pressure surface fit (e.g., Kriging interpolation) that advantageously imposes a spatial correlation among the weather station measurements while yielding a spatially smooth pressure surface. Unlike spline interpolation and the IDW technique, Kriging interpolation is a stochastic technique that uses weighted linear combinations at locations having known values (e.g., pressure measurements of weather stations or stable pressure instruments) to estimate the value at unknown locations (i.e., locations at which there are no weather stations or stable pressure instruments to provide measurements). The weights in Kriging interpolation represent the spatial structure of the sampled data using a variogram model. Studies have reported that due to the use of a variogram model while estimating the Kriging weights, Kriging interpolation performs better than the IDW technique and spline interpolation (Kravchenko (2003), Lu and Wong (2008), Bekele et al., (2003), Chia-Yu et al., (2019)).

The Kriging interpolation method can advantageously be applied to instantaneous measurements from a set of weather stations and produce a set of pressure surface fits that vary over time. An example application of the Kriging method to fit a reference pressure surface, with the imposition of certain constraints in variogram model development and for estimating Kriging weights to mitigate geographical anomalies, is detailed below, in accordance with some embodiments.

Kriging interpolation is an approach that considers the spatial structure of correlation over a domain using a variogram model while constructing the interpolated surface. The formula for the interpolation is as follows:

$$\hat{Z}(x_i, y_i) = \sum \lambda_j Z_j(x_j, y_j), \qquad \text{Equation 1}$$

where i is the location at which a pressure value is to be predicted, j is a location at which a pressure value has been measured and goes from 1 to N for N measurements, $\lambda_j$ is a coefficient (e.g., a weight) associated with each measurement location and represents the spatial correlation between measurements, $Z_j$ is an observed characteristic property at location j, and $\hat{Z}$ is a predicted characteristic property at location i.

The objective of Kriging interpolation is to minimize a prediction error variance while considering a particular spatial correlation structure in a spatial region. To achieve this, a variogram model is constructed (which represents the spatial correlation structure), followed by an estimation of $\lambda_j$ using a Lagrange multiplier approach with a constraint of $\Sigma\lambda_j=1$.

The Lagrange multiplier approach involves introducing a new optimization function by adding weighted constraints to the original optimization function.

To estimate the values for λ of the optimization problem, the variance of error from Equation 1 is minimized, the minimization process being expressed as:

$$\min_{\lambda} \mathrm{Var}(\epsilon(Z)), \quad \text{Equation 2}$$

where $\in(Z)=\hat{Z}(x_i, y_i)-Z(x_i, y_j)$, and $Z(x_i,y_i)$ is the characteristic property (i.e., surface pressure) at location $x_i$, yi. Additionally, in order to ensure unbiasedness, an additional constraint, $\Sigma\lambda j=1$, is imposed. As such, equation 2 becomes:

$$\min_{\lambda} \mathrm{Var}(\epsilon(Z)) \quad \text{Equation 3}$$

$$\text{subject to } \sum \lambda j = 1,$$

which can be rewritten in Lagrange multipliers as:

$$\min_{\lambda,\mu} \mathrm{Var}(\epsilon(Z)) + \mu \sum \lambda_j, \quad \text{Equation 4}$$

where μ is the Lagrange multiplier, and for Var(∈(Z)) a variogram model is used.

A variogram model is a quantitative descriptive statistic representing the spatial continuity of a data set with the assumption that nearby spatial locations behave similarly and as the distance between locations increases, the association between locations decreases. In some embodiments, a variogram model is selected, and drift and lag parameters are defined for the selected model. Optimal model parameters are obtained by a process of tuning, such that the average error with respect to the three nearest weather stations is minimized. The type of variogram model and associated parameters are described below.

The variogram model is used to calculate the covariance between observations, as well as between observations and locations at which predictions are to be made, as a function of distance. The semi-variance "Y" (half of the variogram to account for double counting of pairs) is defined as:

$$\gamma(\Delta x, \Delta y) = \frac{1}{2} E([x + \Delta x, y + \Delta y) - Z(x, y)]^2), \quad \text{Equation 5}$$

where Y is the variogram, E is an expectation operator, x and y are positional arguments (i.e., longitude and latitude), and Z is the characteristic property (i.e., surface pressure). Several types of semi-variogram models may be chosen, ranging from Linear, Exponential, Gaussian, Power, and Spherical models. In some embodiments, a trial-and-error approach is used to determine which model yields the minimum error for many regions.

The model parameters associated with the different model types are:

i.

$$\text{Linear, i.e., } s \times d + n, \quad \text{Equation 6}$$

-continued ii.

$$\text{Exponential, i.e., } p \times \left(1 - \exp\left(\frac{-d}{(r \times n)}\right)\right) + n, \quad \text{Equation 7}$$

iii.

$$\text{Gaussian, i.e., } p \times \left(1 - \exp\left(\frac{-d^2}{\left(\left(\frac{4}{7r}\right)^2\right)}\right)\right) + n, \quad \text{Equation 8}$$

iv.

$$\text{Power, i.e., } s \times d^e + n, \quad \text{Equation 9}$$

v.

$$\text{Spherical, i.e., } p \times \left(\frac{3d}{2r} - \frac{d^3}{2r^3}\right) + n,\ d \le r, \quad \text{Equation 10}$$

$$p + n,\ d > r$$

where, as is known in the art, s is a scaling factor or slope of the model, n is a nugget of the model, d represents distance values at which to calculate the variogram, p is the partial sill (i.e., p=sill−nugget), r is the range parameter, and e is the exponent for the power model. The sill is the asymptotic maximum spatial variance at longest lags (distances). The range represents the distance at which the spatial variance has reached ~95% of the sill variance. The nugget represents the random deviations from an overall smooth spatial data trend and effectively takes up 'noise' in measurements. For stationary variogram models (Gaussian, Exponential, and Spherical), the partial sill (p) is defined as the difference between the full sill and the nugget term. In some embodiments, the optimum set of parameters for the variogram model is found using a "soft" L1 norm minimization scheme. In some embodiments, the minimum error may be found for the 'Linear' and 'Power' semi-variogram models.

Figure 8:
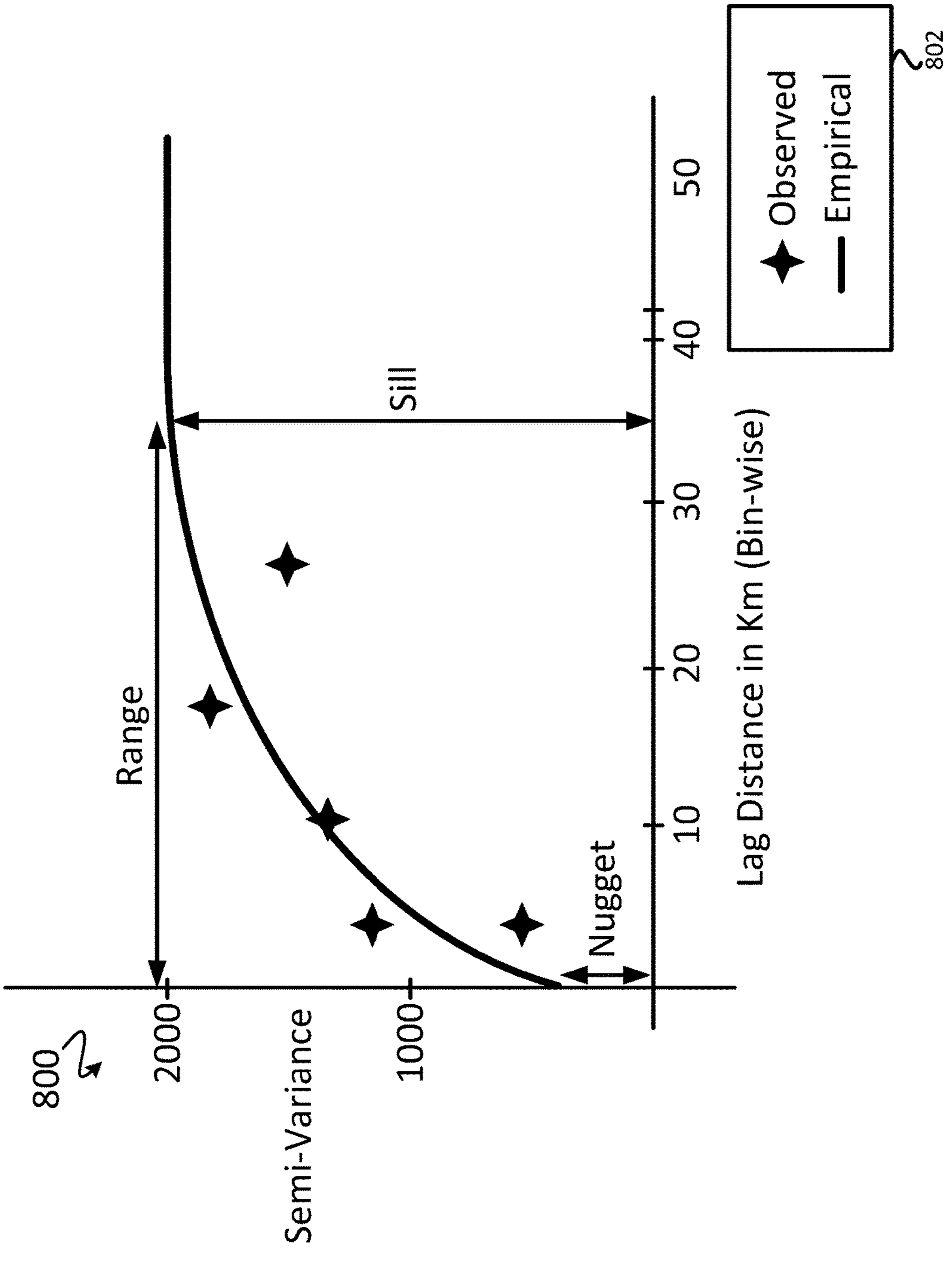
FIG. 8 shows an example portion of a variogram model, in accordance with some embodiments.

When using Kriging interpolation, spatial correlation is representative of an area and is mapped using the variogram model. A simple semi-variogram model along with some associated parameters (i.e., Range, Sill, and Nugget) is shown in FIG. 8. A legend 802 details observed and empirical data points of graph 800.

In the variogram model, range parameters consider the change in correlation with distance. Thus, the range parameter r signifies the distance beyond which the correlation between pairs of weather stations becomes negligible and is customized depending upon the region being considered. For example, in some embodiments, for San Francisco (r=0.09 Km), Los Angeles (r=0.4 Km), Washington (r=0.3 Km), and Texas (r=1.9 Km). This means that in the San Francisco region, beyond a 90 m distance, the correlation between pairs of weather stations is considered negligible and beyond this distance, correlation remains almost constant. In the example shown in FIG. 8, the correlation remains almost constant after a range of about 35 km.

In some embodiments, no drift term for the variogram model is included. In other embodiments, a regional linear drift term for the variogram model is included. In such embodiments, the regional linear drift term may be an average or expected value of the regional variable. In some embodiments, the inclusion or exclusion of the drift term is guided by parameter tuning. Empirical results using embodiments disclosed herein indicate that the error of a variogram model that includes a drift term was lower as compared to that of a variogram model when excluding the "regional drift term."

Lags or "nlags" represent the number of bins into which spatial points are to be grouped for averaging. For example, with nlags equal to six and a maximum distance equal to 30 km, there will be 5 bins grouping the variables covering the distance from 0-6 Km, 6-12 Km, 12-18 Km, 18-24 Km, and 24-30 Km. This is done to avoid a large number of possible combinations of pairs of weather stations. In some embodiments, the value of nlags is varied, e.g., between [2, 4, 6, 8, 10]. The use of specific values of nlags allows for an optimal approach that is computationally cheaper as compared to a brute force approach where all possible values of nlags are included.

In some embodiments, to find the optimum set of parameters, i.e., which variogram model to use, which drift terms to use, and what number of lags to use, each of the parameters is tuned with the objective of minimizing the average error with respect to three nearest weather stations. Empirical results using embodiments disclosed herein indicate that across a broad range of regions, 8 bins are found to provide the minimum errors.

As described above, the first step in Kriging interpolation is the construction of the variogram model and the second step is the estimation of coefficients (i.e., weights) ($\lambda$) such that the variance of prediction error is minimum. Once the coefficients ($\lambda$) are estimated, the value at a location can be predicted using Equation 1. Since the model can be constructed at any resolution in two dimensions, it allows the pressure surface to be a continuous surface. Moreover, this surface is "nudged" (i.e., adjusted) towards the observations, wherever available. This continuous surface captures the actual pressure variations.

To mitigate the effect of waterbodies when determining a reference pressure, the following two use cases with respect to the presence of waterbodies that intervene between weather stations are considered: mitigation of effects from large water bodies, and mitigation of effects from small waterbodies.

In the case of large waterbodies, the Kriging interpolation approach is sufficient to mitigate microclimate effects owing to a weak correlation arising from the large distance (greater than 1.5 km) between weather stations separated by the waterbody. For example, if a first group of weather stations is in San Francisco and another set of weather stations are in Oakland (with a large bay intervening between the two regions) a fitted pressure surface over San Francisco will be less influenced by measurements coming from the weather stations within the Oakland region. That is, the presence of a large waterbody between the two groups of weather stations leads to a weak correlation between the two groups of weather stations in the variogram model. The weak correlation yields smaller weights used in Equation 1 (i.e., the coefficients $\lambda$, in Equation 1). Thus, a reference pressure estimate from Equation 1 for a mobile device situated within San Francisco is less influenced by atmospheric pressure observations from Oakland. This approach can be applied to other regions with large waterbodies. Such regions include Chicago, Florida, Washington (Seattle), and Virginia.

To mitigate the effect of smaller waterbodies, weather stations within a first threshold distance (e.g., 30 km) of a mobile device's estimated location are identified. Weather stations that are within a second threshold distance from waterbodies (e.g., 1 km) are then identified. Dummy variables (e.g., having values of 1 or 0) are then selected to mitigate the effects of weather stations within the second threshold distance from the waterbody for use in either variogram construction and/or estimating weights for the weather stations. When estimating a correlation structure using the variogram model, zero weights are assigned to the weather stations that are within the second threshold distance from the waterbodies. Such weather stations may be identified with the help of water polygons (available from the National Hydrology Center, for example) that delineate water and land areas. This step will partially mitigate the effect of waterbodies. Further mitigation is achieved by imposing an additional constraint in Equation 1 such that weather stations within the second threshold distance from a waterbody are assigned a zero weight. That is, with reference to Equation 1, $\lambda_i=1$ if not near a waterbody, and $\lambda_i=0$ if a weather station is near a waterbody. In some embodiments, this approach may be applied to large waterbodies.

To mitigate the effect of large differences in terrain altitude, the following approach may be used, in accordance with some embodiments. Weather stations within a first threshold distance (e.g., 30 km) of a mobile device's estimated location are identified. Weather stations that are associated with a large difference in terrain altitude are then identified. For example, in some embodiments, a bounding region (e.g., a 20 km square) centered at each weather station is identified. Within the bounding region, an isoline of constant elevation (e.g., 150 m) is determined. Any weather station within the determined isoline is flagged as being associated with a large difference in terrain altitude. Dummy variables (e.g., having values of 1 or 0) are then selected to mitigate the effects of weather stations that are associated with a large difference in terrain altitude for use in either variogram construction and/or estimating weights for the weather stations. When estimating a correlation structure using the variogram model, zero weights are assigned to the weather stations that are flagged as being associated with a large difference in terrain altitude. This step will partially mitigate the effect of weather stations that are associated with a large difference in terrain altitude. Further mitigation is achieved by imposing an additional constraint in Equation 1 such that weather stations that are associated with a large difference in terrain altitude are assigned a zero weight. That is, with reference to Equation 1, $\lambda_i=1$ if weather stations are not associated with a large difference in terrain altitude, and $\lambda i=0$ if a weather station is associated with a large difference in terrain altitude.

Figure 9:
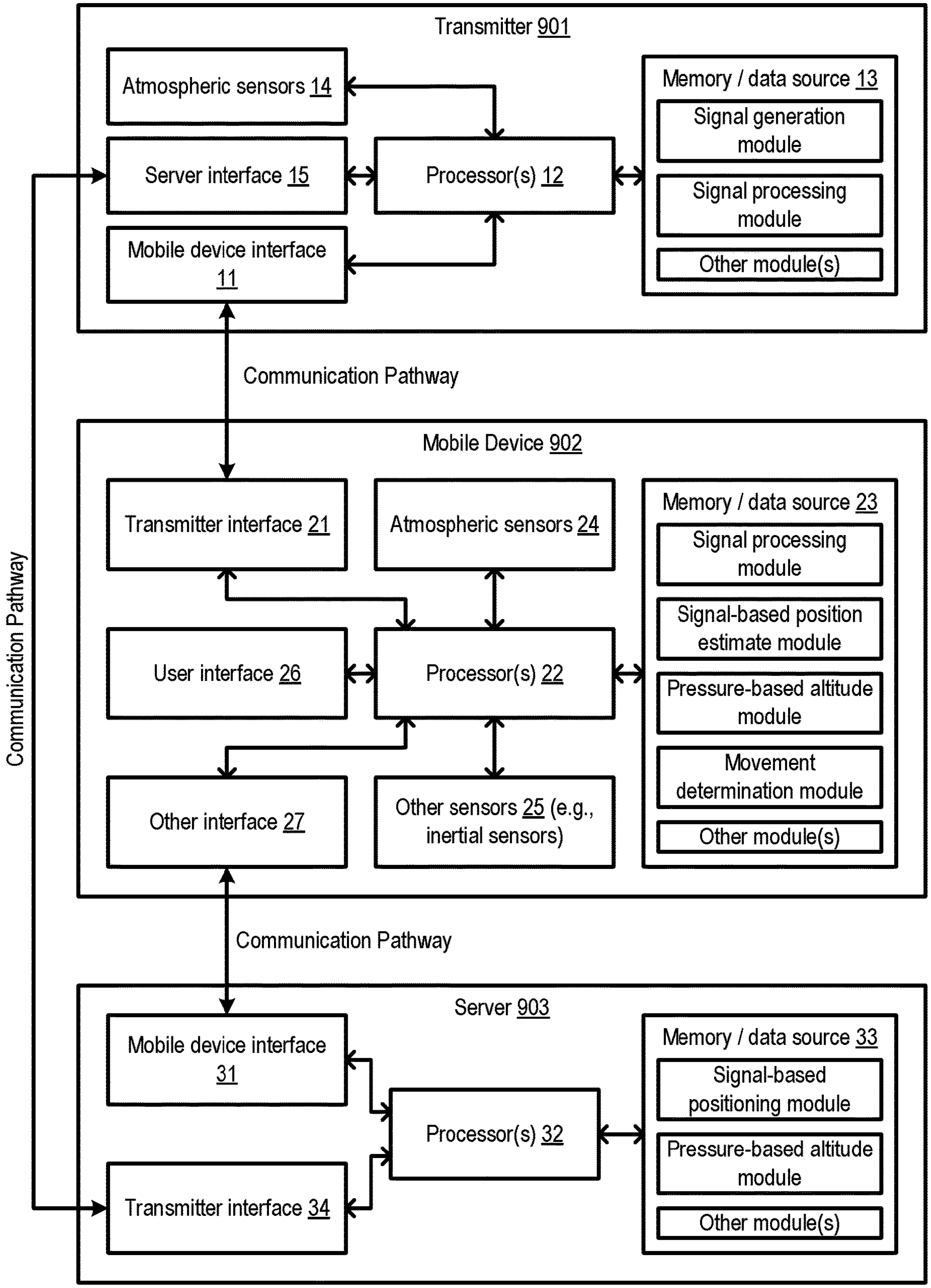
FIG. 9 illustrates components of a transmitter, a mobile device, and a server, in accordance with some embodiments.

FIG. 9 illustrates components of an example transmitter 901 (e.g., either a weather station 104 or a stable pressure instrument 110), an example mobile device 902 (e.g., the mobile device 314/414), and an example server 903 (e.g., the server 112). Examples of communication pathways are shown by arrows between components.

By way of example in FIG. 9, each of the transmitters 901 may include: a mobile device interface 11 for exchanging information with a mobile device (e.g., antenna(s) and RF front-end components known in the art or otherwise disclosed herein); one or more processor(s) 12; memory/data source 13 for providing storage and retrieval of information and/or program instructions; atmospheric sensor(s) 14 for measuring environmental conditions (e.g., pressure, temperature, humidity, other) at or near the transmitter; a server interface 15 for exchanging information with a server (e.g., an antenna, a network interface, or other); and any other components known to one of ordinary skill in the art. The memory/data source 13 may include memory storing software modules with executable instructions, and the processor(s) 12 may perform different actions by executing the instructions from the modules, including: (i) performance of a part or all of the methods as described herein or otherwise understood by one of skill in the art as being performable at the transmitter; (ii) generation of positioning signals for transmission using a selected time, frequency, code, and/or phase; (iii) processing of signals received from the mobile device or another source; or (iv) other processing as required by operations described in this disclosure. Signals generated and transmitted by a transmitter may carry different information that, once determined by a mobile device or a server, may identify the following: the transmitter; the transmitter's position; environmental conditions at or near the transmitter; and/or other information known in the art. The atmospheric sensor(s) 14 may be integral with the transmitter, or separate from the transmitter and either co-located with the transmitter or located in the vicinity of the transmitter (e.g., within a threshold amount of distance).

By way of example in FIG. 9, the mobile device 902 may include: a transmitter interface 21 for exchanging information with a transmitter (e.g., an antenna and RF front-end components known in the art or otherwise disclosed herein); one or more processor(s) 22; memory/data source 23 for providing storage and retrieval of information and/or program instructions; atmospheric sensor(s) 24 (such as barometers and temperature sensors) for measuring environmental conditions (e.g., pressure, temperature, other) at the mobile device; other sensor(s) 25 for measuring other conditions (e.g., inertial sensors for measuring movement and orientation); a user interface 26 (e.g., display, keyboard, microphone, speaker, other) for permitting a user to provide inputs and receive outputs; another interface 27 for exchanging information with the server or other devices external to the mobile device (e.g., an antenna, a network interface, or other); and any other components known to one of ordinary skill in the art. A GNSS interface and processing unit (not shown) are contemplated, which may be integrated with other components (e.g., the interface 21 and the processors 22) or a standalone antenna, RF front end, and processors dedicated to receiving and processing GNSS signaling. The memory/data source 23 may include memory storing software modules with executable instructions, and the processor(s) 22 may perform different actions by executing the instructions from the modules, including: (i) performance of a part or all of the methods as described herein or otherwise understood by one of ordinary skill in the art as being performable at the mobile device; (ii) estimation of an altitude of the mobile device based on measurements of pressure from the mobile device and transmitter(s), temperature measurement(s) from the transmitter(s) or another source, and any other information needed for the computation); (iii) processing of received signals to determine position information (e.g., times of arrival or travel time of the signals, pseudoranges between the mobile device and transmitters, transmitter atmospheric conditions, transmitter and/or locations or other transmitter information); (iv) use of position information to compute an estimated position of the mobile device; (v) determination of movement based on measurements from inertial sensors of the mobile device; (vi) GNSS signal processing; or (vii) other processing as required by operations described in this disclosure.

By way of example in FIG. 9, the server 903 may include: a mobile device interface 31 for exchanging information with a mobile device (e.g., an antenna, a network interface, or other); one or more processor(s) 32; memory/data source 33 for providing storage and retrieval of information and/or program instructions; a transmitter interface 34 for exchanging information with a transmitter (e.g., an antenna, a network interface, or other); and any other components known to one of ordinary skill in the art. The memory/data source 33 may include memory storing software modules with executable instructions, and the processor(s) 32 may perform different actions by executing instructions from the modules, including: (i) performance of a part or all of the methods as described herein or otherwise understood by one of ordinary skill in the art as being performable at the server; (ii) estimation of an altitude of the mobile device; (iii) computation of an estimated position of the mobile device; or (iv) other processing as required by operations described in this disclosure. Steps performed by servers as described herein may also be performed on other machines that are remote from a mobile device, including computers of enterprises or any other suitable machine. As disclosed herein, mobile devices, servers, and atmospheric data measurement stations may each include one or more processors that are operable to carry out steps of processes disclosed herein independently or in conjunction.

Certain aspects disclosed herein relate to estimating the positions of mobile devices—e.g., where the position is represented in terms of: latitude, longitude, and/or altitude coordinates; x, y, and/or z coordinates; angular coordinates; or other representations. Various techniques to estimate the position of a mobile device can be used, including trilateration, which is the process of using geometry to estimate the position of a mobile device using distances traveled by different "positioning" (or "ranging") signals that are received by the mobile device from different beacons (e.g., terrestrial transmitters and/or satellites). If position information like the transmission time and reception time of a positioning signal from a beacon is known, then the difference between those times multiplied by the speed of light would provide an estimate of the distance traveled by that positioning signal from that beacon to the mobile device. Different estimated distances corresponding to different positioning signals from different beacons can be used along with position information like the locations of those beacons to estimate the position of the mobile device. Positioning systems and methods that estimate a position of a mobile device (in terms of latitude, longitude, and/or altitude) based on positioning signals from beacons (e.g., transmitters, and/or satellites) and/or atmospheric measurements are described in co-assigned U.S. Pat. No. 8,130,141, issued Mar. 6, 2012, and U.S. Pat. No. 9,057,606, issued Jun. 16, 2015, incorporated by reference herein in its entirety for all purposes. It is noted that the term "positioning system" may refer to satellite systems (e.g., Global Navigation Satellite Systems (GNSS) like GPS, GLONASS, Galileo, and Compass/Beidou), terrestrial transmitter systems, and hybrid satellite/terrestrial systems.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method comprising:

determining, by one or more processors, an estimated position of a mobile device within a region;

identifying, by the one or more processors, a plurality of atmospheric data measurement stations within the region;

identifying, by the one or more processors using a terrain database, a geographical anomaly within the region that physically intervenes between the estimated position of the mobile device and a position of a first atmospheric data measurement station of the plurality of atmospheric data measurement stations;

determining, by the one or more processors based on a positional relationship between the estimated position of the mobile device, the geographical anomaly, and the position of the first atmospheric data measurement station, that atmospheric pressure measurements collected at the first atmospheric data measurement station should be conditionally used for determining a reference pressure estimate;

determining, by the one or more processors, the reference pressure estimate using a plurality of atmospheric pressure measurements collected at the plurality of atmospheric data measurement stations and conditionally using the atmospheric pressure measurements collected at the first atmospheric data measurement station;

calibrating an atmospheric pressure sensor of the mobile device by adjusting one or more pressure measurements generated by the atmospheric pressure sensor of the mobile device using a calibration value determined using the reference pressure estimate;

determining, by the one or more processors, an estimated altitude of the mobile device using an adjusted pressure measurement of the one or more pressure measurements and the reference pressure estimate; and providing the estimated altitude to a positioning component to determine a three-dimensional position of the mobile device that includes the estimated altitude;

wherein determining that the atmospheric pressure measurements collected at the first atmospheric data measurement station should be conditionally used for determining the reference pressure estimate comprises:

determining, by the one or more processors, that the estimated position of the mobile device is within a defined radius from the position of the first atmospheric data measurement station;

determining, by the one or more processors, one or more exclusion zones within the defined radius based on a position of the geographical anomaly; and upon determining, by the one or more processors, that the estimated position of the mobile device is within an exclusion zone of the one or more exclusion zones, determining that the atmospheric pressure measurements collected at the first atmospheric data measurement station should be conditionally used for determining the reference pressure estimate; and wherein determining one or more exclusion zones within the defined radius based on a position of the geographical anomaly comprises:

determining, by the one or more processors, a plurality of terrain polygons within the region;

determining, by the one or more processors, a respective bounding box for each terrain polygon of the plurality of terrain polygons;

determining, by the one or more processors for each of the respective bounding boxes, a first line extending from the position of the first atmospheric data measurement station to a first corner of that respective bounding box and a second line extending from the position of the first atmospheric data measurement station to a second corner of that respective bounding box;

determining, by the one or more processors, that a respective portion of one or more of the first line and the second line intersect with the geographical anomaly; and upon determining, by the one or more processors, that a distance of one or both of the respective portions of the first line or the second line that intersect the geographical anomaly exceeds a distance threshold, adding the terrain polygon to the exclusion zone.

2. The method of claim 1, further comprising:

determining, based on a positional relationship between the estimated position of the mobile device, the geographical anomaly, and a position of a second atmospheric data measurement station of the plurality of atmospheric data measurement stations, that atmospheric pressure measurements collected at the second atmospheric data measurement station should be unconditionally used for determining the reference pressure estimate.

3. The method of claim 1, wherein determining the reference pressure estimate using the plurality of atmospheric pressure measurements and conditionally using the atmospheric pressure measurements collected at the first atmospheric data measurement station comprises:

excluding the atmospheric pressure measurements collected at the first atmospheric data measurement station for determining the reference pressure estimate, or attenuating a contribution made by the atmospheric pressure measurements collected at the first atmospheric data measurement station for determining the reference pressure estimate.

4. The method of claim 1, wherein determining the reference pressure estimate using the plurality of atmospheric pressure measurements and conditionally using the atmospheric pressure measurements collected at the first atmospheric data measurement station comprises:

determining, by the one or more processors, a continuous interpolated reference pressure surface for the region using the plurality of atmospheric pressure measurements and the atmospheric pressure measurements collected at the first atmospheric data measurement station;

determining, by the one or more processors and using the continuous interpolated reference pressure surface, an interpolated reference pressure corresponding to the estimated position of the mobile device; and using, by the one or more processors, the interpolated reference pressure as the reference pressure estimate.

5. The method of claim 4, wherein:

the continuous interpolated reference pressure surface is determined, by the one or more processors, using Kriging interpolation.

6. The method of claim 5, wherein determining the continuous interpolated reference pressure surface using Kriging interpolation comprises:

determining, by the one or more processors, a variogram model for the region using the plurality of atmospheric pressure measurements and the atmospheric pressure measurements collected at the first atmospheric data measurement station, the variogram model representing a spatial correlation between the atmospheric pressure measurements;

determining, by the one or more processors using the variogram model, a plurality of Kriging coefficient weights; and determining, by the one or more processors, the continuous interpolated reference pressure surface using the plurality of Kriging coefficient weights.

7. The method of claim 6, wherein determining the variogram model for the region comprises:

selecting, by the one or more processors, a variogram model type to use as the variogram model; and determining, by the one or more processors, drift and lag parameters for the variogram model.

8. The method of claim 7, wherein determining the drift and lag parameters for the variogram model comprises:

tuning, by the one or more processors, the drift and lag parameters such that an average error corresponding to a subset of the plurality of atmospheric data measurement stations nearest to the estimated position of the mobile device is minimized.

9. The method of claim 6, wherein determining the variogram model for the region comprises:

determining, by the one or more processors, range, drift, and lag terms of the variogram model corresponding to geographic attributes of the region.

10. The method of claim 6, wherein determining a plurality of Kriging coefficient weights comprises:

determining, by the one or more processors, that the first atmospheric data measurement station is within a threshold distance from a body of water within the region; and assigning, by the one or more processors, a Kriging coefficient weight of zero to the first atmospheric data measurement station.

11. The method of claim 6, wherein determining a plurality of Kriging coefficient weights comprises:

assigning, by the one or more processors, a Kriging coefficient weight of zero to the first atmospheric data measurement station based on a determined difference in terrain altitude within the region.

12. The method of claim 1, wherein:

the calibrating of the atmospheric pressure sensor of the mobile device further comprises:

determining a first estimated position of the mobile device using positioning technology that is not dependent upon a pressure measurement from the atmospheric pressure sensor;

generating a second estimated position of the mobile device using positioning technology that is dependent upon the pressure measurement from the atmospheric pressure sensor and the reference pressure estimate; and determining a sensor error using the first estimated position and the second estimated position; and the calibration value is derived from the sensor error.

13. A method comprising:

determining, by one or more processors, a first position of a weather station within a region;

determining, by the one or more processors, a plurality of respective second positions of a plurality of stable pressure instruments within the region;

identifying, by the one or more processors using a terrain database, a geographical anomaly within the region that physically intervenes between the first position and one or more of the second positions;

collecting, by the one or more processors, atmospheric pressure measurements from the stable pressure instruments at the one or more of the second positions;

determining, by the one or more processors based on a positional relationship between the first position of the weather station, the geographical anomaly, and the one or more of the second positions, that the atmospheric pressure measurements should be conditionally used for calibrating the weather station;

determining, by the one or more processors, a reference pressure estimate conditionally using the atmospheric pressure measurements collected at the stable pressure instruments at the one or more of the second positions; and calibrating, by the one or more processors, an atmospheric pressure sensor of the weather station using the reference pressure estimate, the calibrating comprising: (i) determining, by the one or more processors, a calibration value for the atmospheric pressure sensor of the weather station based on the reference pressure estimate, and (ii) adjusting one or more atmospheric pressure measurements produced by the atmospheric pressure sensor using the calibration value;

wherein determining that the atmospheric pressure measurements should be conditionally used for calibrating the weather station comprises:

determining, by the one or more processors, that the geographical anomaly is a body of water;

determining, by the one or more processors, a two-dimensional distance over the body of water along a line joining the first position and the one or more of the second positions; and upon determining, by the one or more processors, that the two-dimensional distance exceeds a threshold distance, determining that the atmospheric pressure measurements should be conditionally used for calibrating the weather station.

14. A method for barometric altitude estimation using a mobile device, comprising:

determining an estimated position of the mobile device within a region;

obtaining atmospheric pressure measurements from a plurality of atmospheric data measurement stations having known respective station positions;

identifying, using terrain data, a geographical anomaly that physically intervenes between the estimated position of the mobile device and at least one of the station positions;

computing a reference pressure corresponding to the estimated position of the mobile device by:

applying a spatial interpolation model that estimates pressure at an unmeasured location from the atmospheric pressure measurements using station influence factors determined from spatial relationships among the station positions; and modifying at least one of the station influence factors based on the geographical anomaly physically intervening to reduce an influence of the at least one station on the reference pressure;

generating a device pressure measurement using an atmospheric pressure sensor of the mobile device;

determining an estimated altitude using the device pressure measurement and the reference pressure;

calibrating the atmospheric pressure sensor by adjusting subsequent device pressure measurements using a calibration value derived; and determining a calibrated estimated altitude using an adjusted device pressure measurement and the reference pressure;

wherein the modifying of the at least one station influence factor based on the geographical anomaly comprises:

determining that the estimated position of the mobile device is within a defined radius of the at least one station, determining one or more exclusion zones within the defined radius based on a position of the geographical anomaly, the determining of the one or more exclusion zones comprises:

(i) determining a bounding box that includes the geographical anomaly, determining lines extending from the at least one station position to the bounding box; and (ii) defining an exclusion zone by extending the lines from the bounding box to an outer perimeter of the defined radius; and modifying the at least one station influence factor upon determining that the estimated position is within the exclusion zone.

15. The method of claim 14, wherein:

the calibrating of the atmospheric pressure sensor further comprises:

determining a first estimated position of the mobile device using positioning technology that is not dependent on the device pressure measurement;

determining a second estimated position using positioning technology that is dependent on the device pressure measurement and the reference pressure; and determining a sensor error using the first estimated position and the second estimated position; and the calibration value is derived from the sensor error.

16. The method of claim 15, wherein:

the calibrating of the atmospheric pressure sensor further comprises:

logging the sensor error to memory as a logged sensor error associated with the atmospheric pressure sensor, and determining the calibration value using the logged sensor error and one or more previously logged sensor errors;

the method further comprises:

measuring a temperature associated with the atmospheric pressure sensor, logging the temperature with the logged sensor error, and determining the calibration value using the logged temperatures and logged sensor errors; and the determining of the calibration value comprises determining one or more calibration coefficient adjustment values by performing a polynomial fit using the logged temperatures and corresponding logged sensor errors.

17. The method of claim 14, wherein:

the applying of the spatial interpolation model comprises performing Kriging interpolation to estimate pressure at the unmeasured location; and the method further comprises:

constructing a variogram model representing spatial correlation among the atmospheric pressure measurements; and determining the station influence factors as Kriging coefficient weights using the variogram model;

the modifying of the at least one station influence factor comprises at least one of:

attenuating an influence of the at least one station by reducing a corresponding Kriging coefficient weight; or nulling the influence by setting the corresponding Kriging coefficient weight to zero.

18. The method of claim 14, wherein the determining of the one or more exclusion zones comprises:

determining a plurality of terrain polygons within the region, determining a respective bounding box for each terrain polygon;

determining lines extending from the at least one station position to corners of each respective bounding box;

determining an intersection of at least one of the lines with the geographical anomaly; and adding a terrain polygon to an exclusion zone when a distance of a portion of the line that intersects the geographical anomaly exceeds a distance threshold.

* * * * *